(12) United States Patent
Wroblewski

(10) Patent No.: US 7,658,043 B2
(45) Date of Patent: Feb. 9, 2010

(54) CLAMP COLLAR DESIGN

(75) Inventor: Doug Wroblewski, Wattsburg, PA (US)

(73) Assignee: Zurn Industries, LLC, Erie, PA (US)

( * ) Notice: Subject to any disclaimer, the term of this patent is extended or adjusted under 35 U.S.C. 154(b) by 956 days.

(21) Appl. No.: 10/799,340

(22) Filed: Mar. 12, 2004

(65) Prior Publication Data

US 2004/0200162 A1  Oct. 14, 2004

Related U.S. Application Data

(60) Provisional application No. 60/455,260, filed on Mar. 17, 2003.

(51) Int. Cl.
*E04B 1/70* (2006.01)
(52) U.S. Cl. .............. 52/302.1; 4/695; 285/56
(58) Field of Classification Search ............ 52/19, 52/20, 302.1, 302.7; 4/684, 68, 689, 691, 4/286, 695, 650, 679; 210/163, 164, 238, 210/323.1, 451, 470, 480, 474–476, 232; 137/362; 285/56–60
See application file for complete search history.

(56) References Cited

U.S. PATENT DOCUMENTS

| | | | |
|---|---|---|---|
| 1,792,345 A | 2/1931 | Williams | |
| 2,749,999 A | 6/1956 | Schmid | |
| 3,110,323 A * | 11/1963 | Helguera | 137/625.31 |
| 3,246,582 A | 4/1966 | Wade et al. | |
| 3,674,149 A | 7/1972 | Donalson | |
| 4,146,939 A * | 4/1979 | Izzi | 4/286 |
| 4,207,632 A | 6/1980 | Savell, Jr. et al. | |
| 4,325,405 A * | 4/1982 | Christo | 137/371 |
| 4,620,330 A * | 11/1986 | Izzi, Sr. | 4/288 |
| 4,883,590 A | 11/1989 | Papp | |
| 5,124,031 A | 6/1992 | Dallmer | |
| 5,722,791 A | 3/1998 | Dallmer | |
| 5,771,507 A | 6/1998 | Healy et al. | |
| 6,254,770 B1 * | 7/2001 | Remon | 210/163 |
| 6,263,518 B1 * | 7/2001 | Magtanong | 4/289 |
| 6,269,495 B1 | 8/2001 | Sondrup | |
| 6,350,373 B1 | 2/2002 | Sondrup | |
| 6,367,102 B1 * | 4/2002 | McMullen | 4/684 |
| 6,381,775 B1 | 5/2002 | Sondrup | |
| 6,537,447 B2 * | 3/2003 | Remon | 210/163 |
| 6,877,451 B2 * | 4/2005 | Rivas | 114/182 |
| 6,893,864 B2 * | 5/2005 | Allen | 435/296.1 |

OTHER PUBLICATIONS

Specification Sheet for a deck drain, dated Jul. 31, 2002, manufactured by Zurn Industries. Specification Sheet provided by Applicant.

* cited by examiner

*Primary Examiner*—Jeanette E Chapman
*Assistant Examiner*—Daniel Kenny
(74) *Attorney, Agent, or Firm*—The Webb Law Firm

(57) ABSTRACT

A floor drain having a drain body that receives a rotatable frame with a grate. The orientation of the grate and frame about an axis of the drain body may be adjusted by rotating the frame relative to the drain body and clamping the frame in the desired orientation. Adjustments to the orientation of the grate and frame can be made to align the grate and frame with floor tiles or other flooring materials and with walls surrounding the floor drain.

11 Claims, 7 Drawing Sheets

CLAMP COLLAR DESIGN

CROSS REFERENCE TO RELATED APPLICATION

This application claims the benefit of U.S. Provisional Application No. 60/455,260 filed Mar. 17, 2003 entitled "Clamp Collar Design", which is hereby incorporated by reference.

BACKGROUND OF THE INVENTION

1. Field of the Invention

The present invention relates to drains and, more particularly, directed to floor drains that are adjustable to orient the position of the floor drains relative to their surroundings.

2. Description of Related Art

Floor drains are commonly used to funnel fluid from a floor into a drain pipe. By the phrase "floor drain", it is meant a drain positioned in a generally horizontal surface such as in decks (e.g., promenade decks), workshops, kitchens, lavatories, showers and roofs. Floor drains typically include a drain body secured into the floor (such as in a concrete pad) and covered by a grate through which fluid flows. The grate is held in place by a frame connected to the drain body. An upper surface of the frame defines an opening to receive the grate which may be a rectangular, square or circular shape. A lower second surface of the frame is received by the drain body and may be circular in shape. The frame and drain body typically are connected via a collar in only one orientation relative to each other.

Examples of prior art deck/roof drains include Zurn Industries, Inc. Deck Drain Model Nos. Z-150, Z-154 and Z-158. An example of one such prior art drain is shown in FIG. 1. The drain 2 includes a drain body 4 with a drain pipe receiving portion 6, a frame 8 and a grate 10 received in an opening in an upper end 12 of the frame 8. A drain pipe (not shown) is connected to the pipe receiving portion 5. A lower end 14 of frame 8 is seated on a collar 16. The collar 16 and frame lower end 14 are fixed together via a fastener 18 extending therethrough. Another fastener 20 extends through lower frame end 14 and is threaded into an internal extension 22 of the drain body 4. The drain body 4 is fixed into flooring materials, such as in concrete, not shown. A threaded hole 24 may be defined in an underside of the drain body 4 for receiving a fastener (not shown) that is secured into the flooring materials or framework thereunder.

A drawback to this common design for floor drains is that the frame and grate may not be readily alignable with the surroundings of the drain. The drain surroundings may include architectural features such as walls, corners, floor tiles and the like which have fixed geometric configurations. It is generally desirable to position the grate of a floor drain so that the relationship between surrounding architectural features and edges of the frame is aesthetically acceptable. Typically, the complete drain including the frame and the drain body are rotated so as to align the grate with the walls of a building if plumbing line orientation so permits. In this manner, concrete can be poured around the frame to fix the drain position so that the grate edges appear aligned with the walls of a room. In addition, such prior art drains often require adjustment after attachment of the drain pipe to the drain body. Rotation of the drain body and frame may be limited by the orientation of the drain pipe and associated plumbing. This results in an expensive time consuming ordeal during the installation of the floor drains. In some instances, the drain pipe is connected to the side of the drain body, in which case the drain body cannot be rotated to align the grate with the surroundings.

One solution to the problem of orienting the grate frame after installation of a drain in a floor is disclosed in U.S. Pat. No. 5,124,031. The drain includes a main body which receives a rotatable cylindrical insert with an eccentric inner cylinder. A frame with square grate is seated in the eccentric cylinder. By rotating the insert, the eccentric cylinder with grate may be aligned with tiles in the floor. This arrangement requires production of specialized eccentric inserts. In addition, the frame with grate is maintained in position only by the presence of the surrounding floor tiles without being secured to the drain body. Accordingly, a need remains for an adjustable floor drain which utilizes components of existing drain designs and which secures the drain components in their desired orientation.

Therefore, it is an object of the present invention to provide a floor drain with a grate for easy installation and adjustment of the orientation of the drain grate regardless of the orientation of the drain plumbing lines to the surroundings.

SUMMARY OF THE INVENTION

The present invention includes a floor drain having a drain body defining a drain cavity, a frame having a securable end received by the drain body and an exposed end, the frame being rotatable relative to the drain body for adjusting the position of the frame exposed end; a clamp for fixing the securable end of the frame to the drain body; and a grate received by the exposed end of said frame. The securable end of the frame has a circular configuration while the exposed end has a non-circular geometric configuration, such as rectangular, which includes a seat on which the grate is fixed. The frame securable end is received by an annular ledge of the drain body and may slidably engage the ledge when the frame is rotated relative to the drain body. The clamp includes a clamp body having a protrusion for clamping the frame securable end to the drain body and a fastener extending through the frame securable end and the clamp body that is threaded into the drain body. The clamp body may include a sloped drain body engaging surface to provide a gap between a portion of the drain body engaging surface and the drain body. A fastener receiving member may extend from the drain body into the drain cavity so that the clamp body protrusion can clamp the frame securable end to the fastener receiving member.

In use, the drain body is installed in a floor and the frame is seated on the drain body. The frame may be rotated relative to the drain body to orient the frame to a desired position relative to surroundings of the floor drain. Once the frame is in the desired position, the rotatable frame is secured to the drain body, and the grate is positioned in the frame. The step of rotating the frame orients the geometric configuration of the frame exposed end relative to the floor drain surroundings such as floor tiles or wall. In this manner, the frame and grate can be oriented in aesthetically desirable positions.

DESCRIPTION OF THE PREFERRED EMBODIMENT(S)

Figure 1:
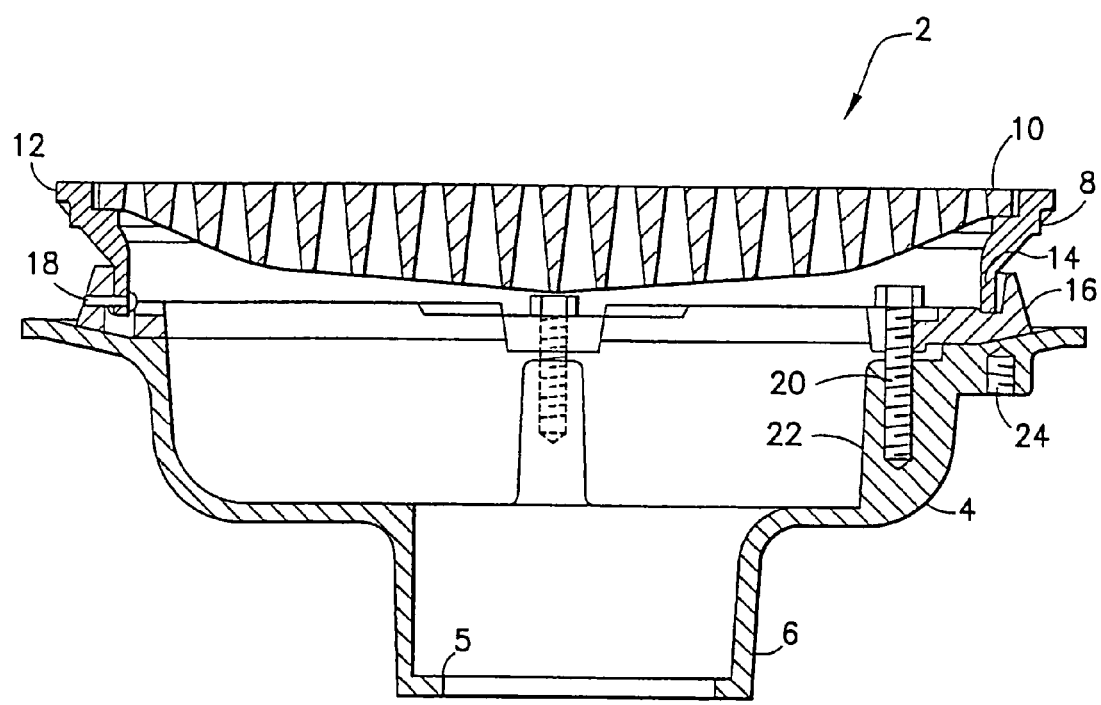
FIG. 1 is a sectional elevational view of a prior art drain.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 2:
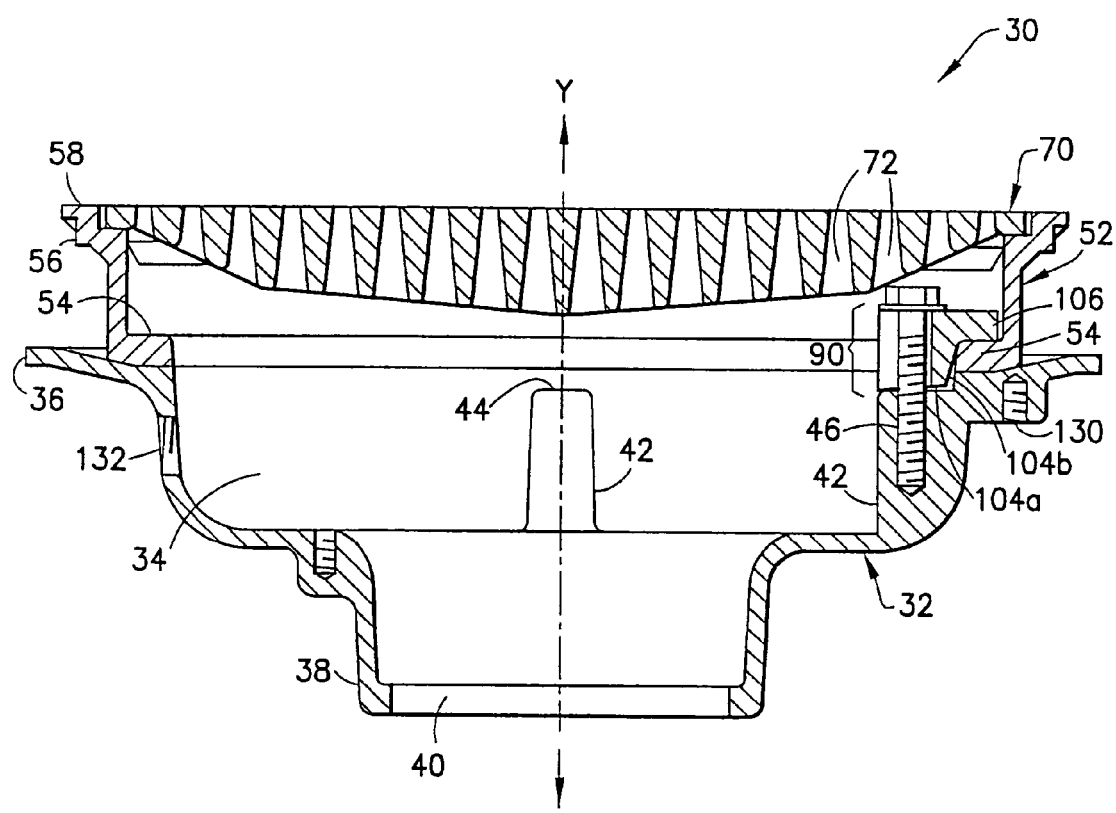
FIG. 2 is a sectional elevational view of a drain made in accordance with the present invention.
Figure 3:
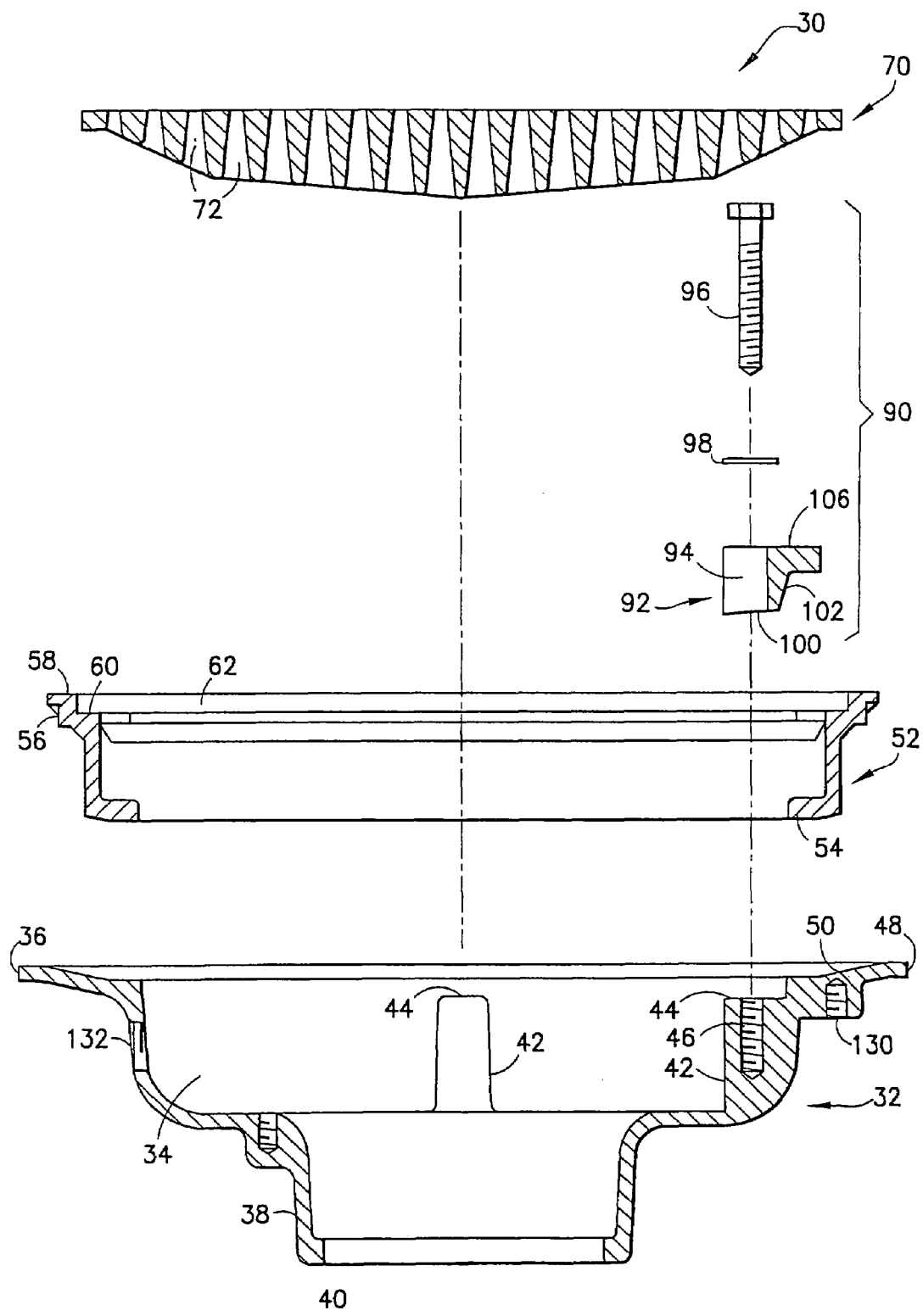
FIG. 3 is an exploded elevational view of the drain shown in FIG. 2 with drain body, rotatable frame, grate and clamp body.
Figure 6:
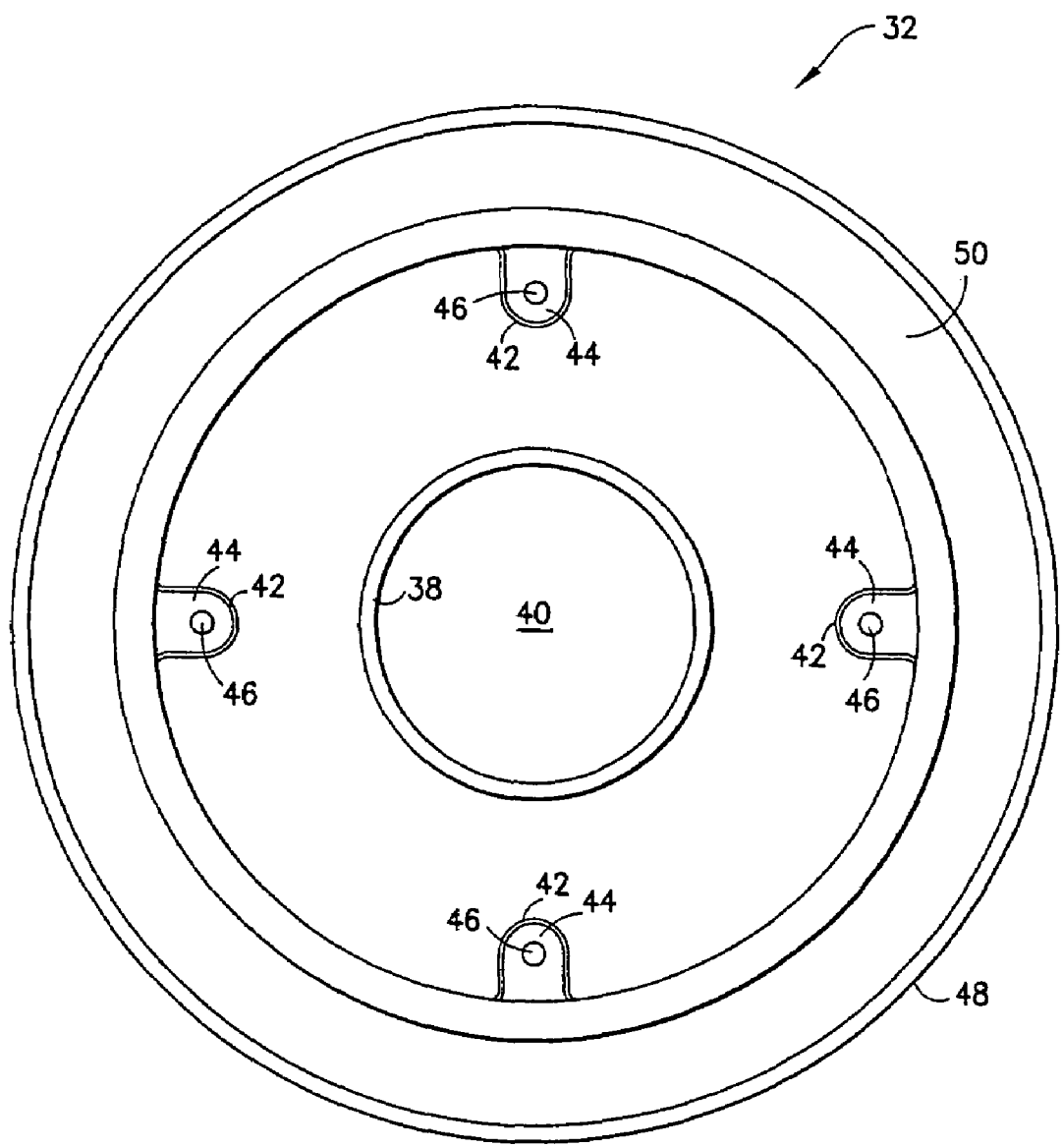
FIG. 6 is a top plan view of the drain body shown in FIGS. 2 and 3.

FIGS. 2 and 3 show a drain 30 made in accordance with the present invention. The drain 30 includes a drain body 32 defining a body cavity 34 and having a frame receiving end 36 and a pipe receiving end 38. The pipe receiving end 38 may terminate with a tubular opening 40 as shown in FIGS. 2 and 3 for connection to a drainage pipe, not shown. A plurality of extensions or fingers 42, preferably four as shown in FIG. 6 that are spaced about ninety degrees apart, extend into the body cavity 34. Two such fingers 42 are shown. The fingers 42 include an upper surface 44 that defines fastener receiving holes 46 which may be threaded.

The drain body frame receiving end 36 includes a ledge 48 with a sloped surface 50 for receiving a rotatable frame 52. The frame 52 includes a lower inwardly extending lip 54 that cooperates with the drain body sloped surface 50. The sloped surface 50 of ledge 48 provides a circular or annular surface along which the frame 52 may be rotated. For example, the frame 52 and drain body 32 share a common Y axis. A change in position of the frame 52 relative to the drain body 32 may be effected by sliding the frame lip 54 along the drain body sloped surface 50. An upper grate receiving end 56 includes a stepped ledge 58 with seat 60 thereby defining a grate opening 62.

Figure 4:
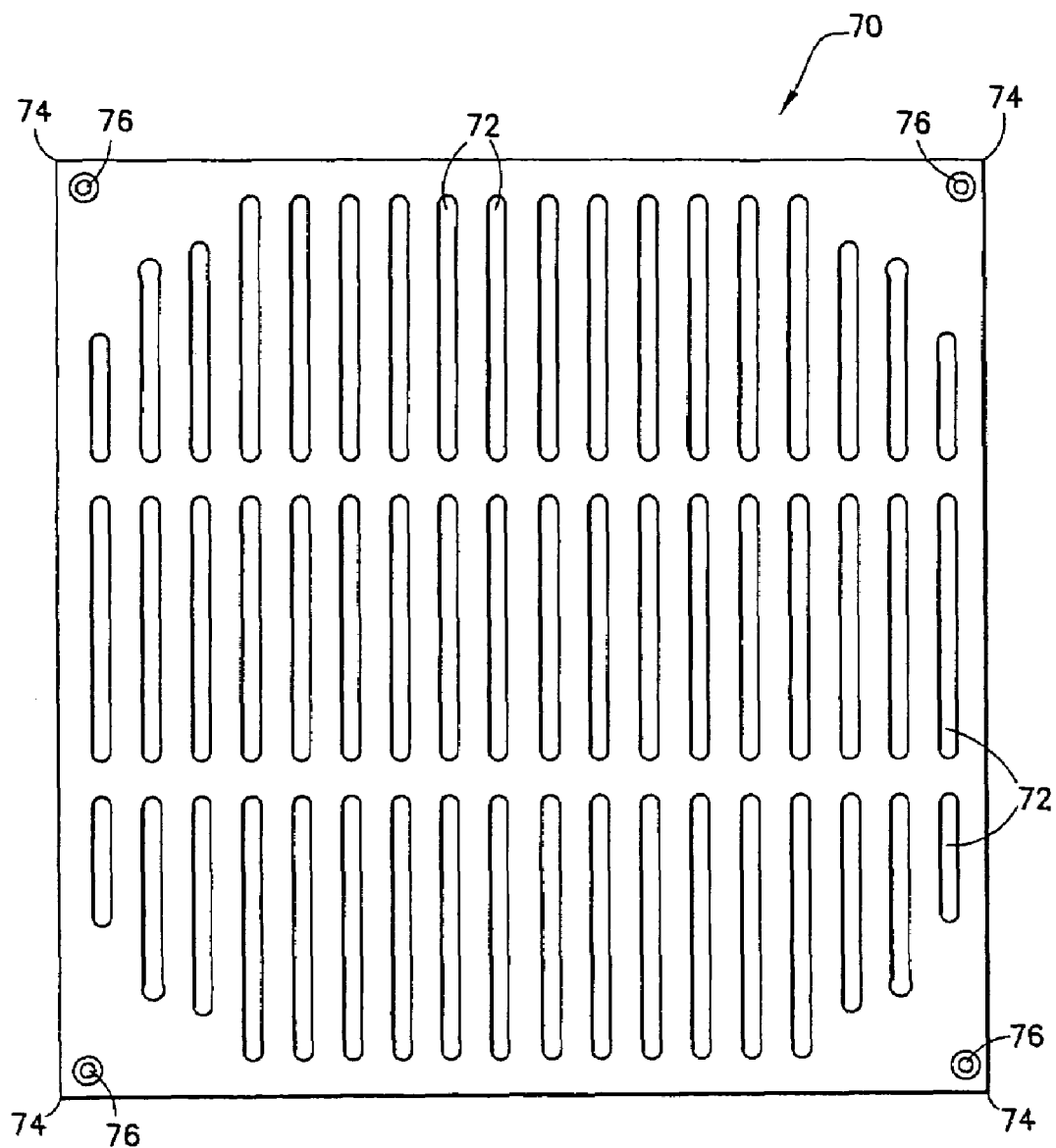
FIG. 4 is a top plan view of the grate shown in FIGS. 2 and 3.
Figure 5:
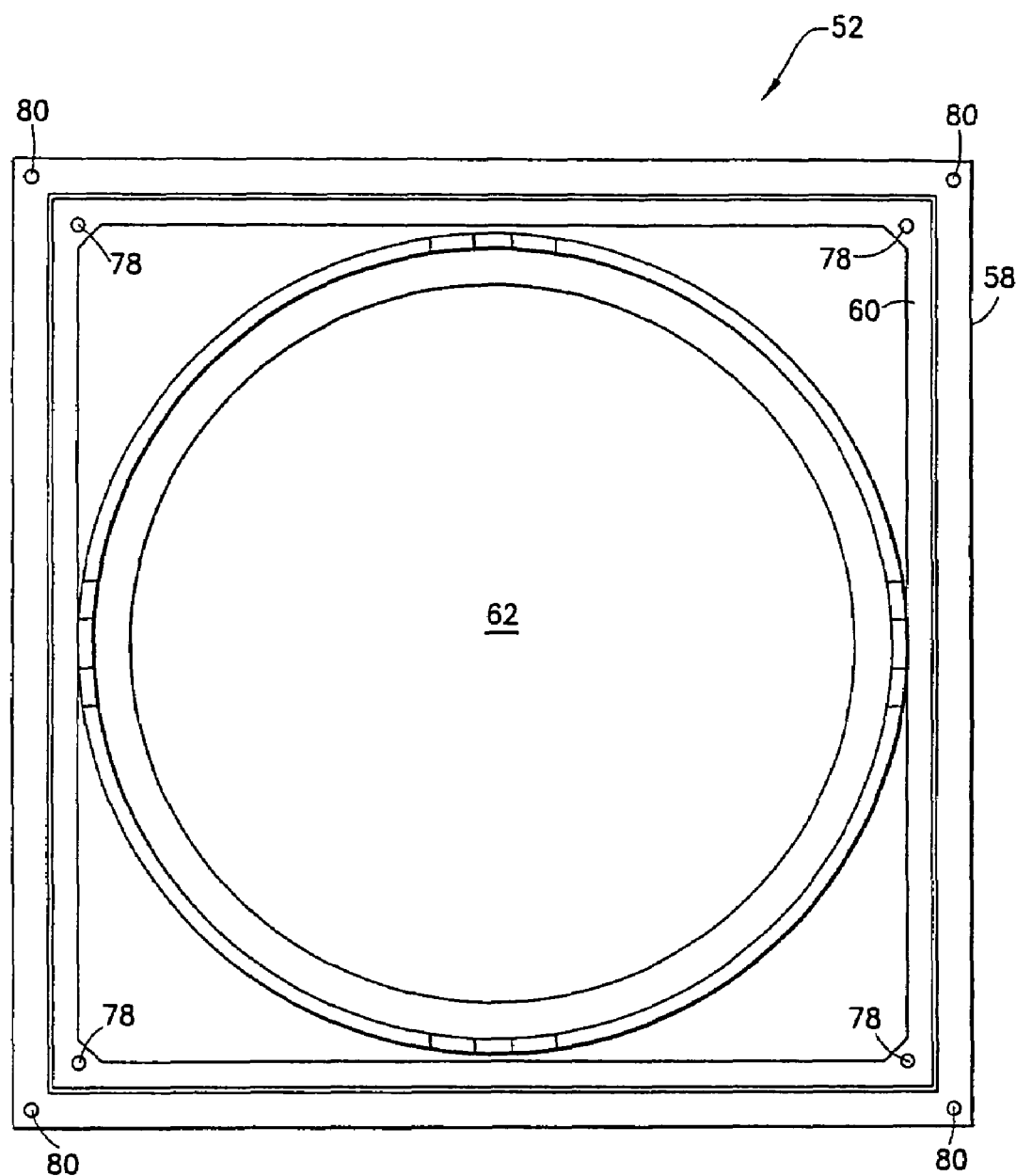
FIG. 5 is a top plan view of the rotatable frame shown in FIGS. 2 and 3.

A grate 70 (FIG. 4) is positioned on seat 60 spanning opening 62 and preferably has a plurality of slots 72 defined therein with a square or rectangular perimeter shape. The slots 72 may be arranged in various configurations to allow fluid to pass through the grate 72 and the body cavity 34 and out through the pipe receiving end 38. The grate receiving end 56 of the frame 52 is rectangular or geometric shaped to coordinate with the shape of the grate 70. Referring to FIGS. 4 and 5, corners 74 of the grate 70 may define openings 76 which may be aligned with holes 78 defined in seat 58 of frame 52. Fasteners (not shown) may extend through openings 76 and into holes 78 to secure the grate 70 to the frame 52. Additional frame corner holes 80 may be defined in ledge 58 to receive fasteners (not shown) for securing the frame 52 to flooring materials such as tiles.

Figure 7:
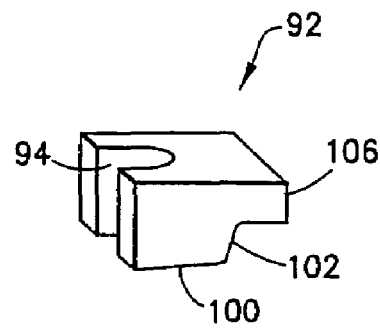
FIG. 7 is a perspective view of the clamp body shown in FIGS. 2 and 3.

A clamp 90 is provided to secure the frame 52 to the drain body 32. While only one clamp 90 is shown in FIGS. 2 and 3, a plurality of clamps 90 may be used, i.e., one clamp 90 for each finger 42 of the drain body 32. Each clamp 90 includes a clamp body 92 (FIG. 7) defining a U-shaped slot or passageway 94 for receipt of a fastener 96. A washer 98 is provided for receipt by the fastener 96. The clamp body 92 includes a sloped lower surface 100 which seats on the finger surface 44. A side surface 102 opposing slot 94 is also sloped. The sloped surfaces 100 and 102 create gaps 104a and 104b, respectively, between the clamp body 92 and the finger 42 and frame lip 54. Gaps 104a and 104b provide adjustability of frame 52 as described hereinafter. The clamp body 92 further includes a protrusion 106 positionable on the lip 54 of the frame 52.

The frame 52 seats on the ledge 48 of the drain body 32 as shown in FIG. 2. The frame lip 54 is sandwiched between the protrusion 106 and ledge 48. Fastener 96 extends through washer 98, slot 94 through or beyond the frame securable end and is threaded into fastener receiving hole 46.

Figure 8:
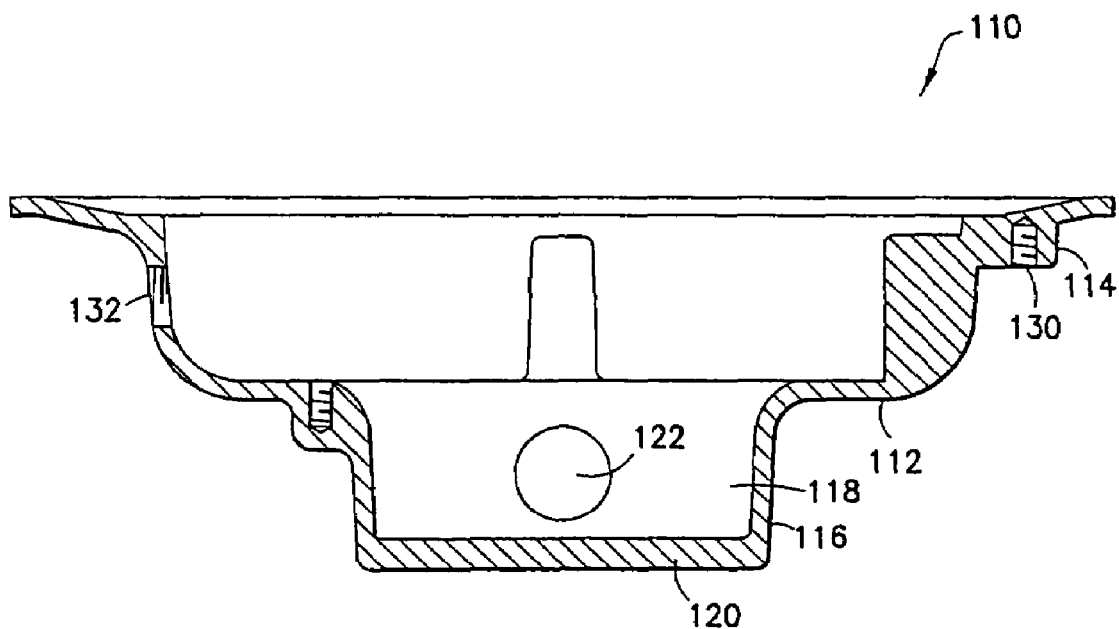
FIG. 8 is a sectional elevational view of an alternative drain body.

An alternative drain body 110 is shown in FIG. 8. The features of drain body 32 are also present in drain body 100 except as described hereafter. Drain body 110 has a drain body 112, frame receiving end 114 and pipe receiving end 116 with surrounding wall 118 and terminating with a base 120. An opening 122 in surrounding wall 118 is sized and configured for receiving a drainage pipe.

In operation, when the drain 30 is installed (using either drain body 32 or drain body 110), piping is secured to the pipe receiving end 38 of the drain body 32 or piping is secured to opening 122 of drain body 110. This is typically done via a threaded connection or gasket-type connection, which is well-known in the art. Walls may be installed in the surroundings of the drain. The surrounding flooring, such as concrete or tile, is installed. The drain body 30 or 110 may be fixed to the surrounding floor using fasteners threaded into hole 130 or opening 132 defined therein. Following installation of surrounding floor, the frame and the grate may be oriented with the walls or tiles of the flooring in a desirable orientation. To re-orient the grate 30 for alignment with the surroundings, the fasteners 96 are loosened and the frame 52 is rotated about a Y axis (a common axis passing through the frame 52 and the drain body 32 or 110) relative to the drain body 32 or 110. The frame 52 may be slid along the circular or annular shape of the ledge 48. Once the frame 52 is oriented properly, the fasteners 96 are tightened to secure the frame 52 to the drain body 32 or 100. Tightening the fastener 96 urges at least a portion of the sloped surface 100 of the clamp body 92 into engagement with the finger surface 44. Such tightening may cause clamp body 92 to tilt towards the frame 32. Gap 104a may be reduced in dimensions as protrusion 106 clamps frame lip 54 to the drain body 32. Gap 104b is provided to minimize opportunity for interference between the clamp body 92 and frame lip 54 or frame 32 during tightening of the fasteners 96. The grate 70 is then placed on seat 60 so that the grate 70 is properly oriented with the surroundings of the drain.

The present invention overcomes the deficiency of the prior art, whereby the installer of a floor drain had to guess the orientation of the walls relative to the grate and frame of the drain and could not orient the grate and frame parallel with the drain surrounding. In the present invention, the frame 52 is adjustable in an infinite quantity of positions relative to the drain body 32.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

The invention claimed is:

1. A drain comprising:
a drain body defining a drain cavity;
a frame having a securable end received by said drain body and an exposed end, said frame securable end including a lip, said frame being rotatable relative to said drain body for adjusting the position of said frame exposed end;
a clamp for fixing said securable end of said frame to said drain body; and
a grate received by said exposed end of said frame, wherein said drain body comprises a ledge having a sloped surface, said frame securable end slidably engaging said sloped surface of said ledge when said frame is rotated relative to said drain body, wherein said clamp comprises a clamp body having a protrusion for clamping at least a portion of said lip of said frame securable end between said protrusion and said drain body and wherein said clamp further comprises a fastener extending between the lip and an opening in the drain body and being threaded into said drain body.

2. The drain of claim 1, wherein said frame securable end has a circular configuration.

3. The drain of claim 2, wherein said frame exposed end has a non-circular geometric configuration.

4. The drain of claim 3, wherein said frame exposed end has a rectangular configuration.

5. The drain of claim 3, wherein said frame exposed end comprises a seat, said grate being fixed to said seat.

6. A method of installing a floor drain comprising:
fixing a drain body in a floor;
positioning a rotatable frame on the drain body by rotating the frame relative to the drain body, thereby orienting the frame to a desired position relative to surroundings of the floor drain;
securing the rotatable frame to the drain body; and
positioning a grate in the frame, wherein said drain body comprises a ledge having a sloped surface, said frame slidably engaging said sloped surface of said ledge when said frame is rotated relative to said drain body, wherein the frame has a securable end having a circular configuration that is received by the drain body wherein said securable end includes a lip and said securing step comprises clamping at least a portion of the lip of the securable end of the frame between a protrusion of a clamp body and the drain body and wherein said clamping comprises extending a fastener through the clamp body and between the lip and an opening in the drain body and threading the fastener into the drain body.

7. The method of claim 6, wherein the frame has an exposed end having a geometric configuration, such that said step of positioning the frame comprises orienting the geometric configuration of the frame exposed end relative to the floor drain surroundings.

8. The method of claim 7, wherein the floor surroundings comprises floor tiles.

9. The method of claim 7, wherein the floor surroundings comprises walls.

10. A drain comprising:
a drain body defining a drain cavity;
a frame having a securable end received by said drain body and an exposed end, said frame securable end including a lip, said frame being rotatable relative to said drain body for adjusting the position of said frame exposed end;
a clamp for fixing said securable end of said frame to said drain body; and
a grate received by said exposed end of said frame, wherein said clamp comprises a clamp body having a protrusion for clamping at least a potion of said lip of said frame securable end to said drain body, and wherein said clamp body comprises a sloped drain body engaging surface to provide a gap between a portion of said drain body engaging surface and said drain body and wherein said clamp further comprises a fastener extending between the lip and an opening in the drain body.

11. A drain comprising:
a drain body defining a drain cavity;
a frame having a securable end received by said drain body and an exposed end, said frame securable end including a lip, said frame being rotatable relative to said drain body for adjusting the position of said frame exposed end;
a clamp for fixing said securable end of said frame to said drain body; and
a grate received by said exposed end of said frame, wherein said drain body comprises a ledge having a sloped surface, said frame securable end slidably engaging said sloped surface of said ledge when said frame is rotated relative to said drain body, wherein said clamp comprises a clamp body having a protrusion for clamping at least a portion of said lip of said frame securable end between said protrusion and said drain body and wherein said clamp further comprises a fastener extending beyond said frame securable end and said clamp body and being threaded into said drain body and wherein the fastener does not extend through the protrusion.

* * * * *

UNITED STATES PATENT AND TRADEMARK OFFICE
CERTIFICATE OF CORRECTION

PATENT NO.      : 7,658,043 B2  
APPLICATION NO. : 10/799340  
DATED           : February 9, 2010  
INVENTOR(S)     : Doug Wroblewski It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1413 days.

Signed and Sealed this

Thirtieth Day of November, 2010

David J. Kappos
*Director of the United States Patent and Trademark Office*